US011300098B2

(12) United States Patent
Laursen et al.

(10) Patent No.: US 11,300,098 B2
(45) Date of Patent: Apr. 12, 2022

(54) BLADE MOUNTING ARRANGEMENT (71) Applicant: Siemens Gamesa Renewable Energy A/S, Brande (DK)

(72) Inventors: Christian Laursen, Hedensted (DK); Signe Lisby, Outrup (DK); Poul Seerup Thing, Ikast (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 222 days.

(21) Appl. No.: 16/477,636

(22) PCT Filed: Nov. 9, 2017

(86) PCT No.: PCT/EP2017/078686
§ 371 (c)(1),
(2) Date: Jul. 12, 2019

(87) PCT Pub. No.: WO2018/133963
PCT Pub. Date: Jul. 26, 2018

(65) Prior Publication Data
US 2021/0131399 A1 May 6, 2021

(30) Foreign Application Priority Data
Jan. 19, 2017 (DE) ...................... 10 2017 200 845.8

(51) Int. Cl.
*F03D 1/06* (2006.01)
(52) U.S. Cl.
CPC ........ *F03D 1/0658* (2013.01); *F05B 2240/21* (2013.01); *F05B 2240/50* (2013.01); *F05B 2250/231* (2013.01)
(58) Field of Classification Search
CPC .................................................... F03D 1/0658
See application file for complete search history.

(56) References Cited

U.S. PATENT DOCUMENTS 6,371,730 B1 * 4/2002 Wobben ................ F03D 7/0224
416/244 R
7,780,417 B2 * 8/2010 Kirchner ............... F03D 1/0658
416/207
(Continued)

FOREIGN PATENT DOCUMENTS

CN 103221683 A 7/2013
CN 104533728 A 4/2015
(Continued)

OTHER PUBLICATIONS

Merriam Webster, Definition of "a number of" (Year: 2021).*
(Continued)

*Primary Examiner* — Topaz L. Elliott
(74) *Attorney, Agent, or Firm* — Schmeiser, Olsen & Watts LLP (57) ABSTRACT

Provided is a blade mounting arrangement at the interface between a hub and a rotor blade of a wind turbine, which blade mounting arrangement includes at least an annular bearing including a stationary part mounted to the hub and a rotating part mounted to the root end of the blade; and a reinforcing ring arranged between the bearing rotating part and the root end of the blade, which reinforcing ring includes a cylindrical body portion shaped as an extension of the root end of the blade. A wind turbine including a hub and a number of blades mounted to the hub, and with such a blade mounting arrangement at the interface between the hub and each rotor blade is also provided. A method of realizing an interface between a hub and a rotor blade of a wind turbine is also provided.

11 Claims, 5 Drawing Sheets

(56) References Cited

U.S. PATENT DOCUMENTS

| | | | |
|---|---|---|---|
| 7,874,800 B2 * | 1/2011 | Kirchner | F03D 7/0224 416/155 |
| 9,239,040 B2 * | 1/2016 | Leonard | F03D 1/0658 |
| 9,328,716 B2 * | 5/2016 | Alti Barbon | F03D 80/50 |
| 2007/0231137 A1 * | 10/2007 | Nitzpon | F03D 7/0224 416/43 |
| 2008/0191488 A1 | 8/2008 | Kirchner et al. | |
| 2008/0193295 A1 | 8/2008 | Kirchner et al. | |
| 2009/0311104 A1 | 12/2009 | Steffensen | |
| 2010/0098552 A1 * | 4/2010 | Aarhus | F03D 1/0658 416/248 |
| 2011/0142618 A1 * | 6/2011 | Moore | F03D 80/00 415/229 |
| 2011/0142636 A1 * | 6/2011 | Curtin | F03D 1/0675 416/62 |
| 2013/0177419 A1 | 7/2013 | Zaehr | |
| 2013/0216394 A1 * | 8/2013 | Leonard | F03D 1/0658 416/248 |
| 2013/0243599 A1 | 9/2013 | Pasquet | |
| 2014/0003944 A1 | 1/2014 | Pasquet | |
| 2014/0003946 A1 * | 1/2014 | Moore | F03D 80/00 416/174 |
| 2014/0361547 A1 * | 12/2014 | Alti Barbon | F03D 9/25 290/55 |
| 2015/0176567 A1 * | 6/2015 | Fernandez Falces | F03D 80/70 416/155 |
| 2015/0300322 A1 * | 10/2015 | Kosuri | F03D 7/0224 416/174 |
| 2016/0003215 A1 * | 1/2016 | Kralmann | F03D 1/0675 416/230 |
| 2016/0290313 A1 * | 10/2016 | Zwart | F03D 1/0658 |
| 2016/0341176 A1 | 11/2016 | Shaik | |
| 2018/0156203 A1 * | 6/2018 | Christensen | F03D 7/0224 |
| 2018/0313326 A1 * | 11/2018 | Trede | F03D 80/70 |
| 2020/0116125 A1 * | 4/2020 | Gudewer | F03D 80/70 |

FOREIGN PATENT DOCUMENTS

| | | | | |
|---|---|---|---|---|
| DE | 10201726 A1 * | 8/2003 | | F03D 1/0658 |
| DE | 202005007450 U1 * | 7/2005 | | F16C 33/581 |
| DE | 202005007450 U1 | 7/2005 | | |
| DE | 102007008166 A1 | 8/2008 | | |
| DE | 102007008167 B4 | 9/2009 | | |
| EP | 1959129 A2 | 8/2008 | | |
| EP | 2458200 A1 | 5/2012 | | |
| EP | 2623769 A1 * | 8/2013 | | B29C 70/86 |
| EP | 2679805 A1 | 1/2014 | | |
| EP | 2679816 A1 | 1/2014 | | |
| GB | 2517935 A * | 3/2015 | | F03D 1/0658 |
| WO | WO-2011050806 A2 * | 5/2011 | | F03D 1/0658 |
| WO | 2015120925 A1 | 8/2015 | | |
| WO | WO-2019122019 A1 * | 6/2019 | | F03D 1/0658 |

OTHER PUBLICATIONS

Annex to the Communication fromt he Examining Division by EPO in corresponding application 17807723.6, dated Feb. 18, 2022 (Year: 2022).*
Mon-English Chinese Office Action for Application No. 201780084113.6, dated Apr. 10, 2020.
German Examination Report dated Nov. 13, 2017 for Application No. 10 2017 200 845.8.
International Search Report dated Mar. 14, 2018 for Application No. PCT/EP2017/078686.

* cited by examiner

BLADE MOUNTING ARRANGEMENT

CROSS-REFERENCE TO RELATED APPLICATIONS

This application claims priority to PCT Application No. PCT/EP2017/078686, having a filing date of Nov. 9, 2017, which is based off of DE Application No. 10 2017 200 845.8, having a filing date of Jan. 19, 2017, the entire contents both of which are hereby incorporated by reference.

FIELD OF TECHNOLOGY

The following relates to a blade mounting arrangement, a wind turbine, and a method of realizing an interface between a hub and a rotor blade of a wind turbine.

BACKGROUND

Wind turbines of the type currently being installed and deployed generally have a number of blades attached to a rotor hub, whereby each blade is attached to the hub by means of a blade bearing or pitch bearing so that the blade pitch angle can be adjusted. The circular root end of the rotor blade—for example a fibreglass composite moulded blade—is usually bolted to the rotating part of the bearing, while the stationary part is secured to the hub. The pitch bearing allows the blade pitch angle to be adjusted to capture as much energy as possible from the wind, and also allows the blade to be feathered in stormy conditions. At the interface between blade and hub, the blade bearing is vulnerable to structural deformations. While a bearing is generally designed to perform satisfactorily even if slightly deformed, a too-large deformation can compromise the bearing kinematics to the extent that the bearing lifetime is reduced. For example, a significant degree of deformation may result in wear and damage to the bearing well before its planned expiration.

The blade root end is generally circular in shape so that it can be mounted to a circular bearing. One type of structural deformation that leads to bearing damage is in-plane deformation which causes the otherwise circular bearing to become slightly oval. This type of deformation can be counteracted by attaching a stiffener plate to the bearing. However, another type of structural deformation is an out-of-plane deformation, which cannot be corrected by a stiffening plate. Such out-of-plane bearing deformation can arise on account of the very large forces transferred through the bearing when the wind load is very high. The magnitude of the forces acting on the blade/hub interface is directly related to blade length. The problem is therefore highly relevant for the very long blades being used in present-day offshore wind turbine. The out-of-plane bearing deformation can significantly compromise the bearing flatness, and can lead to early failure.

SUMMARY

An aspect relates to provide an improved blade mounting arrangement that overcomes the problems described above.

According to embodiments of the invention, the blade mounting arrangement at the interface between a hub and a rotor blade of a wind turbine comprises at least an annular bearing comprising a stationary part mounted to the hub and a rotating part mounted to the root end of the blade; and a reinforcing ring arranged between the bearing rotating part and the root end of the blade, which reinforcing ring comprises a cylindrical body portion shaped as an extension of the root end of the blade (or simply "blade root end" in the following). A main diameter of the reinforcing ring corresponds to a main diameter of the blade root end. The main diameter of the reinforcing ring may be understood to be a diameter measured between two midpoints in the wall or body of the reinforcing ring; similarly the main diameter of the blade root end may be understood to be a diameter measured between two midpoints in the wall or body of the blade root end.

An advantage of the inventive blade mounting arrangement is that its stiffness is greater than a comparable blade mounting arrangement that does not incorporate such a reinforcing ring. The added stiffness can be sufficiently great as to prevent any out-of-plane distortion or deformation of the bearing. Since the inventive blade mounting arrangement can be used in conjunction with known techniques for overcoming in-plane deformation of the bearing, it is possible to achieve a blade mounting arrangement that remains essentially free of any such deformation, whether in-plane or out-of-plane, for the duration of its use. This can lead to a prolonged lifetime of a rotor blade pitch system as well as to a reduction in maintenance costs. The inventive blade mounting arrangement can also facilitate the use of longer rotor blades, since it is effectively able to minimize or eliminate the out-of-plane deformation associated with long blades that would be subject to high wind loading. The reduction or elimination of the bearing deformation will result in a reduction in forces on the bearing, for example on the balls of a ball bearing, and consequently a reduction in wear may be expected. The inventive blade mounting arrangement can also lead to a favourable reduction in other potentially harmful bearing mechanics effects, e.g. edge-running damage, ball cage stress damage, etc.

According to embodiments of the invention, the wind turbine comprises a hub and a number of blades mounted to the hub, and further comprises a blade mounting arrangement according to embodiments of the invention at the interface between the hub and at least one of the rotor blades. The inventive wind turbine can have favourably reduced maintenance costs, since the bearings at the interfaces between hub and rotor blades will be less susceptible to deformation over the lifetime of the bearings.

According to embodiments of the invention, the method of realizing an interface between a hub and a rotor blade of a wind turbine comprises the steps of providing an annular bearing at the interface between the hub and a rotor blade and mounting a stationary part of the annular bearing to the hub; arranging a reinforcing ring between the rotating part of the annular bearing and the root end of the blade, which reinforcing ring comprises a cylindrical body portion shaped as an extension of the root end of the blade; and forming a mechanical connection between the rotating part of the annular bearing, the reinforcing ring, and the root end of the blade.

An advantage of the method according to embodiments of the invention is that an improvement to a blade/hub interface can be achieved with favourably little effort. A reinforcing ring can be manufactured in a straightforward manner, and this ring can be incorporated into an existing blade/hub interface without any significant re-design. For example, for a blade/hub interface that uses bolts to connect the various components, it may be sufficient to use longer bolts. A reinforcing ring can even be used to upgrade or retro-fit a blade/hub interface of an existing wind turbine.

In the following, it may be assumed that a wind turbine rotor blade is made in a conventional manner by moulding layers of composite material such as fibreglass, and by applying a suitable resin transfer moulding technique. To attach such a blade to a wind turbine hub, it is usual to embed bolts or bushings in the annular root end, so that a bolt connection can be made between the blade root end and a pitch bearing installed at the hub. A pitch bearing has a stationary part that is mounted to the hub, and a complementary rotating part that is attached in some way to the blade root end. A pitch bearing may be realised as any suitable kind of bearing such as a ball bearing, a fluid bearing, a sliding bearing, a roller bearing, etc.

In the following, the terms "pitch bearing", "bearing", "annular bearing" and "bearing ring" may be used interchangeably. A pitch drive motor arranged in the hub can turn the rotating part of the bearing by the required amount to achieve a desired blade pitch angle.

Since the in-plane and out-of-plane distortions are particularly relevant for large wind turbines whose rotor blades are subject to great loading forces, in the following it may be assumed that the main diameter of the root end of a rotor blade is in the region of 3 to 6 metres or more. This in turn implies a similar diameter for the bearing.

As indicated above, the bearing ring of a rotor blade pitch system, when mounted directly to the root end of the blade, can suffer from in-plane and out-of-plane distortion by the great forces that may be applied to it by wind loading. In the known pitch designs, the stiffness of the overall arrangement (blade root end and bearing) is insufficient to withstand these forces. This is partly due to the relatively low stiffness of the blade root end, which is generally made of moulded fibreglass. The combined stiffness of the root end and bearing ring is therefore compromised by the relatively low root end stiffness. In an exemplary embodiment of the invention, therefore, the dimensions and material properties of the reinforcing ring are chosen to achieve a desired increase in stiffness over a comparable blade mounting arrangement, i.e. a blade mounting arrangement that does not comprise such a reinforcing ring. In a particularly exemplary embodiment of the invention, the reinforcing ring is made of a metal such as cast iron or structural steel. The stiffness of steel or cast iron is typically about ten times greater than the stiffness of fibre glass, and the inventive blade mounting arrangement achieves an advantageous increase in overall stiffness since it places a rigid and stiff component in a location in which there would normally only be fibreglass.

In an exemplary embodiment of the invention, in a further measure to improve the stiffness of the overall arrangement, the inventive blade mounting arrangement comprises a number of reinforcing plates or stiffening plates. A reinforcing plate may be disc-shaped and large enough to fit onto the bearing. In a particularly exemplary embodiment of the invention, the bearing is sandwiched between an inner reinforcing plate and an outer reinforcing plate.

The stiffness of a component is generally determined to some extent by its physical shape. In a particularly exemplary embodiment of the invention, the reinforcing ring has an I-shaped or H-shaped cross-section, with a flange at either end of a straight web, using a cross-section known from I-beams or H-beams used in the construction industry. The reinforcing ring therefore comprises a straight cylindrical web, bounded at both ends by an annular flange. This shape can significantly improve the ability of the reinforcing ring to withstand torsion. The width of a flange corresponds to the wall thickness of the blade root end. This construction maximises the surface contact between the outer surface of the upper flange and the blade root end face.

In the case of a reinforcing ring with such a cross-section, the width of the web is at most 50% of the wall thickness of the blade root end, at most 30% of the wall thickness of the blade root end. The web is arranged relative to the flanges so that a midpoint of the web is in line with a midpoint of the blade root end. A symmetrical cross-sectional shape is exemplary. A lower limit for the thickness of the web may effectively be determined only by the size of the bore required to accommodate the connecting bolts that pass through the web.

The height of the reinforcing ring can also influence the stiffness of the overall mounting arrangement. Therefore, in a further exemplary embodiment of the invention, the height of the reinforcing ring is at least as high as the thickness or height of the bearing ring. The height of the reinforcing ring is between 100% and 200% of the bearing height or thickness. It has been observed that a height in the order of at least 100% of the bearing thickness is sufficient to achieve the desired degree of stiffness.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
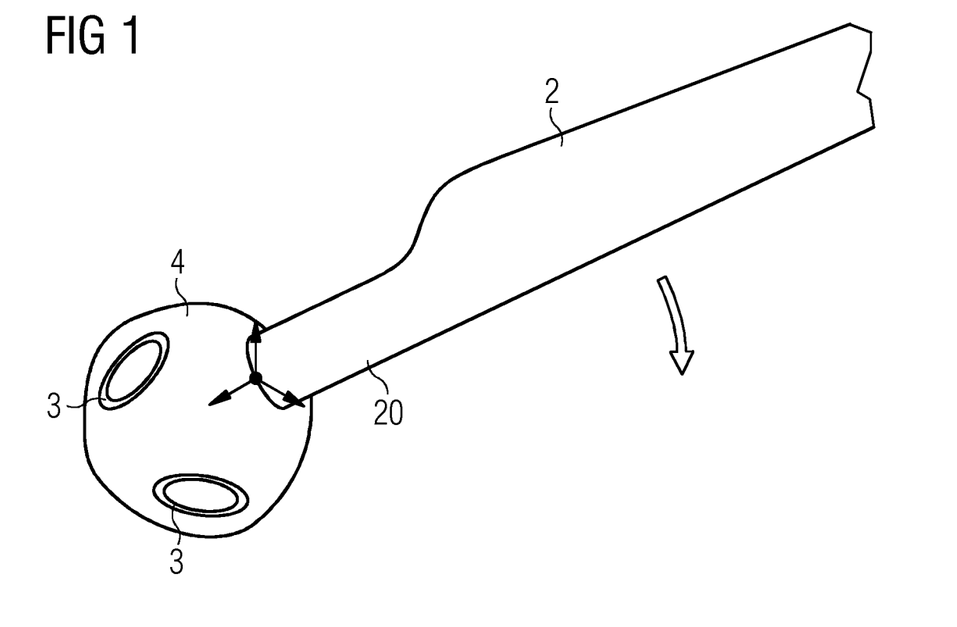
FIG. 1 shows a known blade mounting arrangement.
Figure 2:
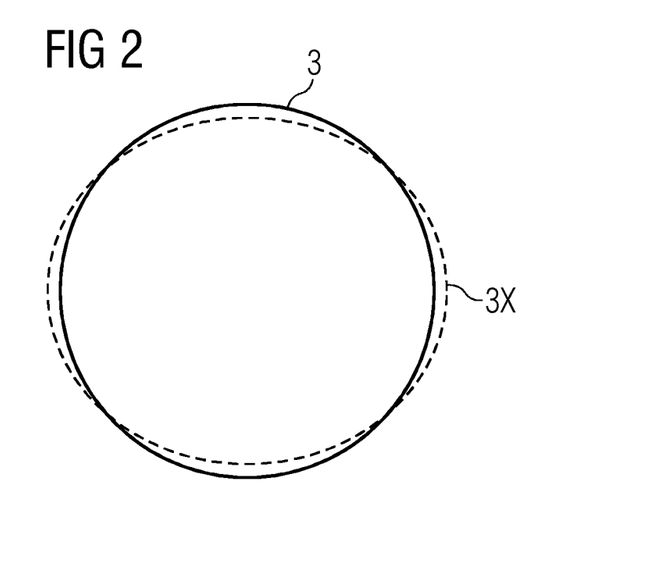
FIG. 2 indicates an in-plane bearing deformation of the known blade mounting arrangement of FIG. 1.

FIG. 1 shows a blade mounting realisation known from the known art. Here, three rotor blades 2 are mounted to the hub 4 of a wind turbine 8 (the diagram only partially shows one blade 2 for the sake of clarity). The hub 4 is at the front end of a nacelle 80, which in turn is mounted on top of a tower 81. The root end 20 of each blade 2 is bolted to a circular pitch bearing 3 arranged at a suitably shaped opening in the hub 4. The blades 2 can be subject to very strong forces, mainly due to wind loading. Significant forces can be transferred to the hub 4 and can act in any direction at any point along the root/hub interface 24 of a blade 2. For example, deflection of the blade airfoil can result in a bending moment at the root/hub interface. The forces transferred from one blade 2 to the hub 4 can result in slight deformation of the hub 4, and such deformations can result in deformation of the circular bearings 3 of the blades 2. FIG. 2 indicates in exaggerated manner an in-plane deformation generally referred to as "ovalization", in which the otherwise circular shape of the bearing 3 becomes slightly oval, resulting in an "ovalized" bearing 3X. Even a very slight ovalization can greatly detract from the performance of the bearing.

Figure 3:
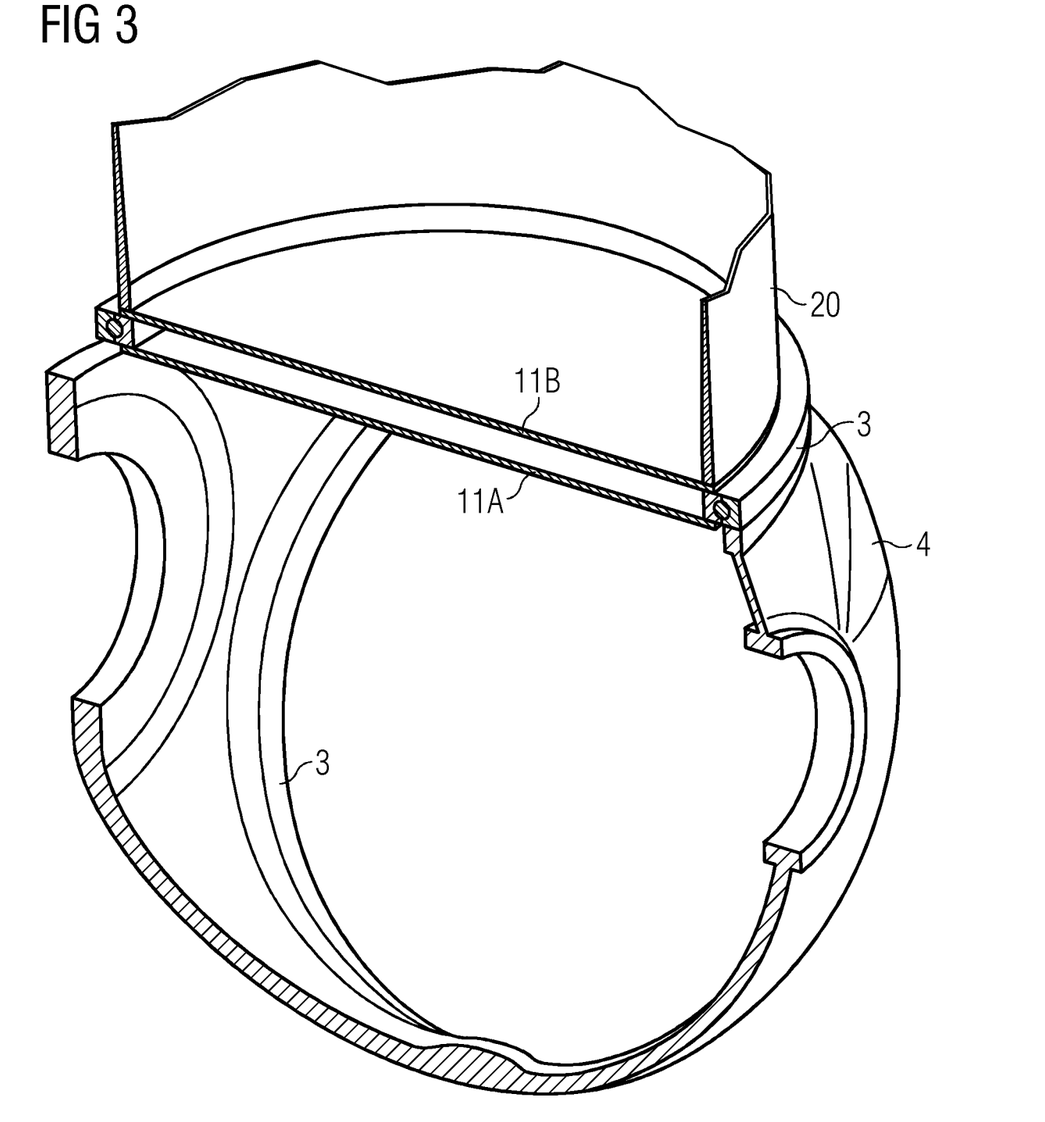
FIG. 3 shows a further known blade mounting arrangement.
Figure 4:
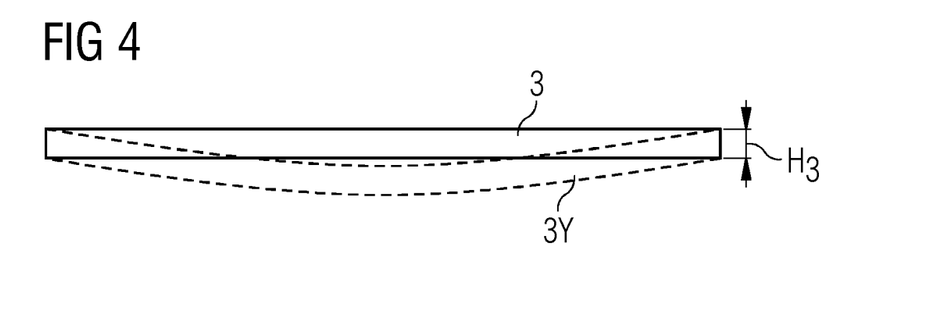
FIG. 4 indicates an out-of-plane bearing deformation of the known blade mounting arrangement of FIG. 3.

FIG. 3 shows a further blade mounting realisation known from the known art. Here, to avoid an in-plane deformation of the bearing 3, circular reinforcing plates 11A, 11B are secured on either side of the bearing 3, i.e. one plate 11A on the inner side or hub side of the bearing 3 and one plate 11B on the outer side or blade side of the bearing 3. While these reinforcing plates 11A, 11B can prevent ovalization of the bearing 3, they cannot prevent an out-of-plane deformation of the bearing 3. FIG. 4 indicates in exaggerated manner an out-of-plane deformation, in which the otherwise flat plane of the bearing 3 becomes distorted, resulting in a "warped" bearing 3Y. In this case also, even a very slight out-of-plane distortion can greatly detract from the performance of the bearing. Even a bearing with a relatively large thickness or height $H_3$ may be subject to deformation.

Figure 5:
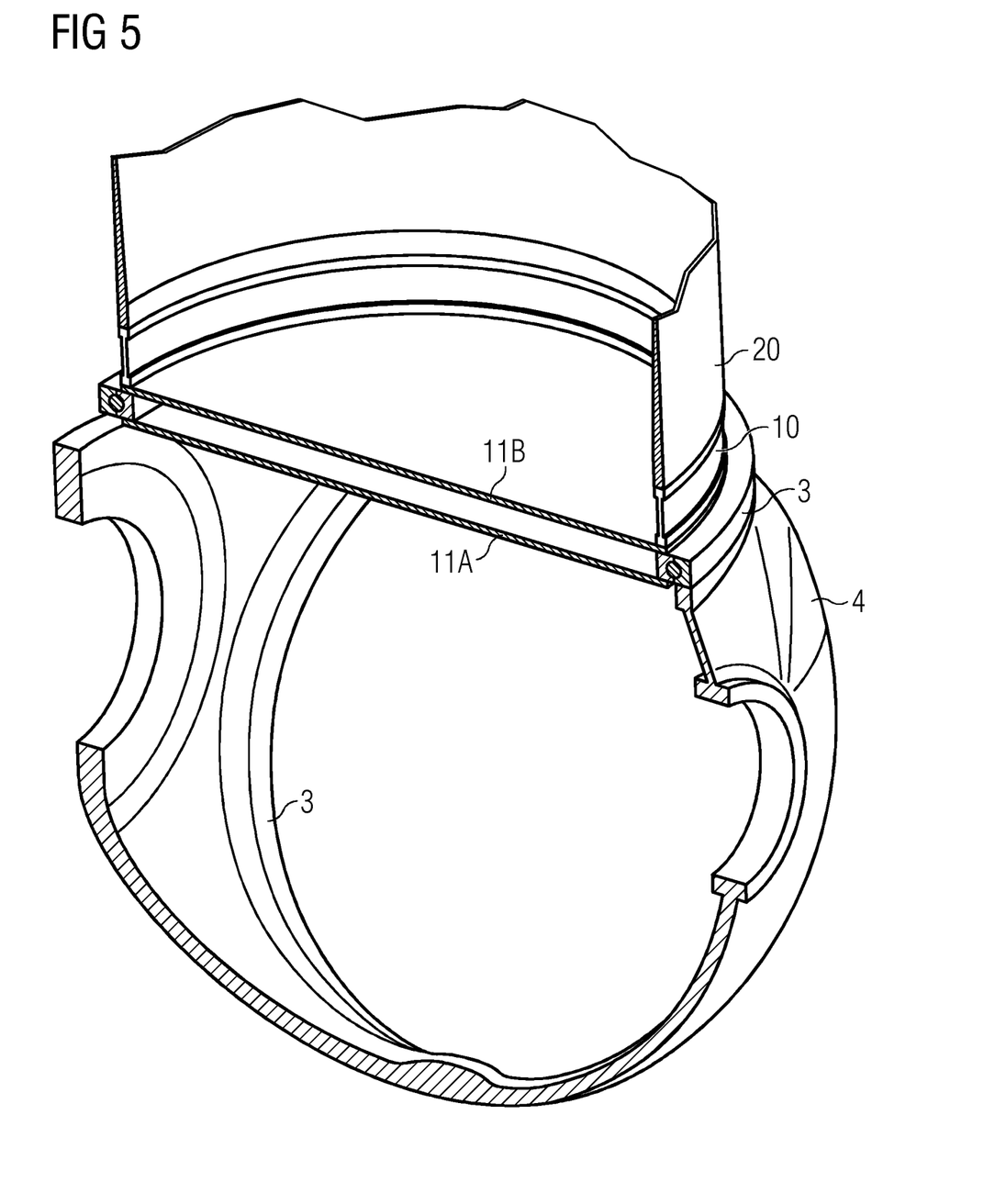
FIG. 5 shows a cross-section through an embodiment of the inventive blade mounting arrangement.

FIG. 5 shows a cross-section through an embodiment of the inventive blade mounting arrangement 1. As in the previous diagrams, three rotor blades 2 are mounted to the hub 4 of a wind turbine. The root end 20 of each blade 2 is bolted to an annular pitch bearing 3. In this embodiment, a pair of circular reinforcing plates 11A, 11B as described in FIG. 3 above is secured on either side of the annular bearing 3 so that in-plane deformation of the bearing 3 is effectively prevented. In addition to this measure, a reinforcing ring 10 is arranged between the bearing 3 and the blade root end 20. The reinforcing ring 10 has the same diameter as the blade root end 20. In this embodiment, the outer reinforcing plate 11B is effectively "sandwiched" between the reinforcing ring 10 and the bearing 3.

Figure 6:
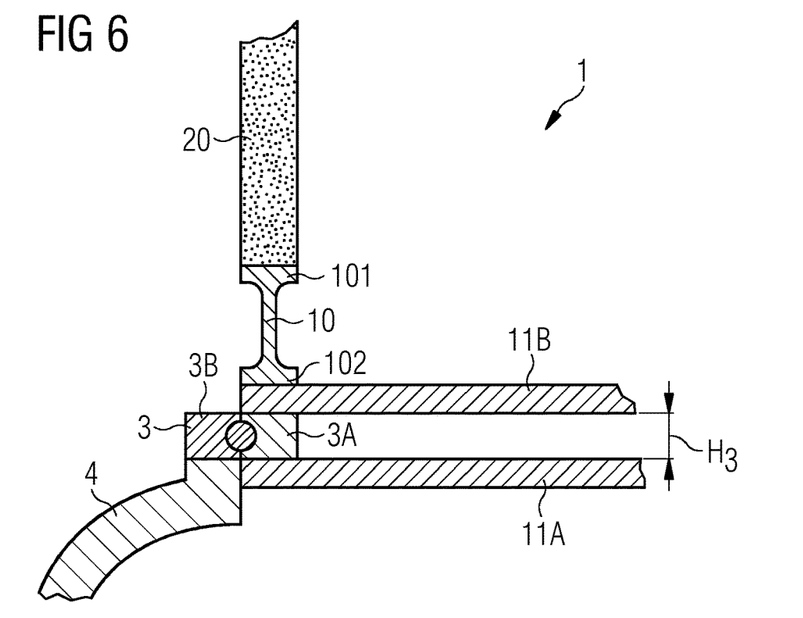
FIG. 6 shows that a more detailed cross-section through the embodiment of FIG. 5.

FIG. 6 shows that the cross-section of the reinforcing ring 10 has the shape of a capital "H" lying on its side (or an upright capital "I"), with flanges 101, 102 at the inner and outer ends of the reinforcing ring 10. The main cylindrical body may be regarded as the web. The skilled person will be familiar with this shape, which is used in the construction industry (generally at a much larger scale) in straight I-beams or H-beams that are used to provide structural strength in buildings.

This diagram also shows the bearing 3 to be composed of an inner bearing part 3A and an outer bearing part 3B. The inner bearing part 3A rotates as one with the blade root end 20, while the outer bearing part 3B is stationary and is secured to the hub 4. In this exemplary embodiment, the bearing 3 is realized as a ball bearing, but can of course be realized using any appropriate bearing design. The diameter $D_{20}$ measured between midpoints of the reinforcing ring 10 is essentially the same as the root end diameter $D_{20}$, measured between midpoints of the root end wall.

Figure 7:
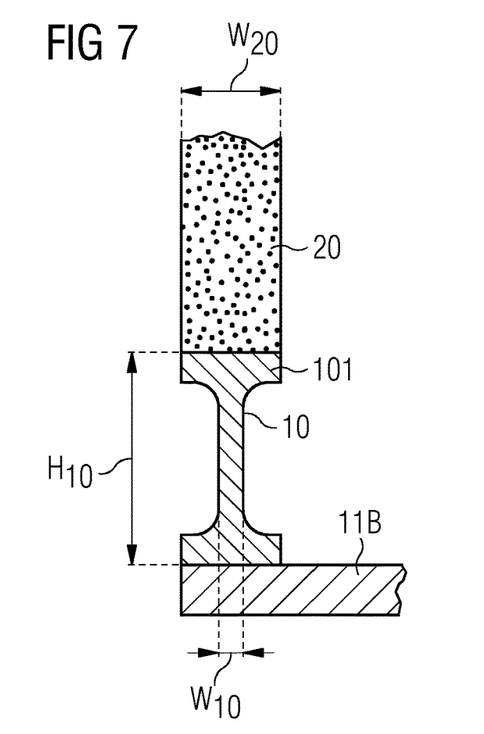
FIG. 7 shows an embodiment of the reinforcing ring in which the flanges are equal in size.

FIG. 7 shows an embodiment of the reinforcing ring 10 in which the flanges 101, 102 are equal in size and have a width $w_{20}$ that is essentially the same as the wall thickness at the blade root end 20. The web or main body of the reinforcing ring 10 need not be as wide as the flanges 101, 102, and the diagram shows that the web has a significantly smaller thickness $w_{10}$. This allows a relatively light reinforcing ring 10 which still delivers the desired structural stiffness to the overall mounting arrangement 1. The web thickness $w_{10}$ may be at most 50% of the flange width $w_{20}$ or even less. The ring height $H_{10}$ may be at least as thick as the bearing height $H_3$.

Figure 8:
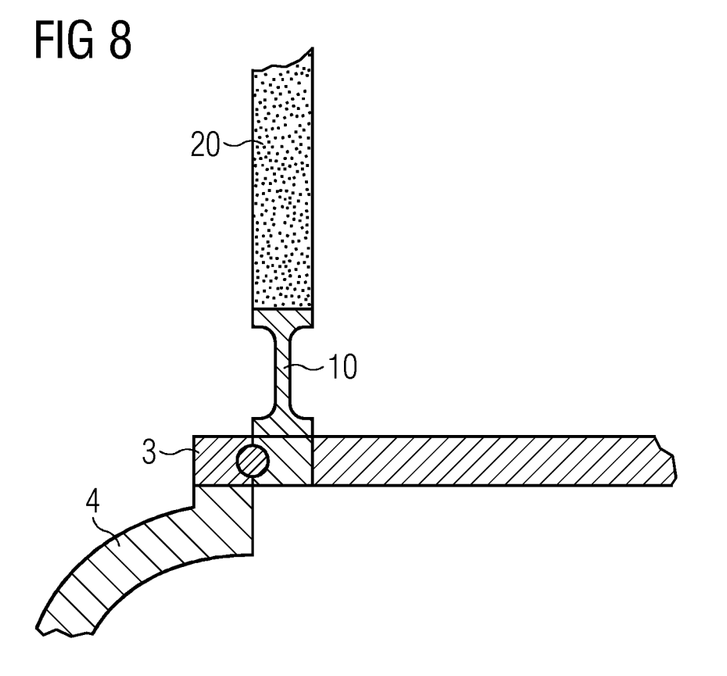
FIG. 8 shows an alternative embodiment of the reinforcing ring.

FIG. 8 shows an alternative embodiment of the reinforcing ring 10. Here, to avoid an in-plane deformation of the bearing 3, the reinforcing ring 10 is mounted directly onto the rotating part of the bearing 3. This embodiment is similar to that of FIG. 6, but does not use the reinforcing plates. The combined stiffness of the bearing 3 and reinforcing ring 10 may be sufficient to avoid deformation if the bearing diameter is relatively small and/or if the bearing 3 itself is relatively stiff and/or if the reinforcing ring 10 is relatively thick.

Figure 9:
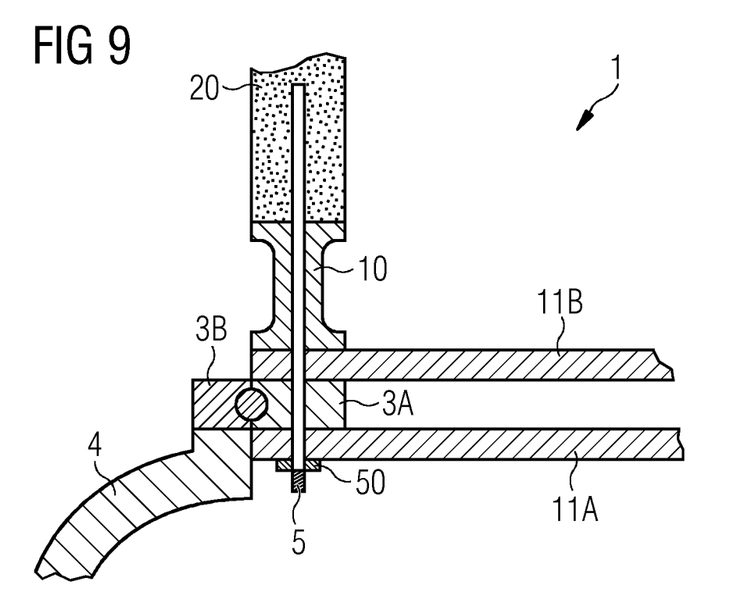
FIG. 9 shows further embodiments of the inventive blade mounting arrangement.

The reinforcing ring 10 can be secured to the bearing 3 and to the blade root end 20 by means of bolts or other fasteners inserted through an appropriate number of through-holes. For example, a bolt can be inserted from the hub end through a series of matching through-holes formed in the inner reinforcing plate 11A, the rotating part 3A of the bearing 3, the outer reinforcing plate 11B, the reinforcing ring 10, and the blade root end 20. Such a bolt may be threaded to engage with an inner thread of a bushing embedded in the blade root end 20, for example. Alternatively, as shown in FIG. 9, bolts 5 can be embedded in the blade root end 20 to extend through a series of matching through-holes formed in the reinforcing ring 10, the outer reinforcing plate 11B, the rotating part 3A of the bearing 3, and the inner reinforcing plate 11A. A nut 50 can be tightened around the threaded outer end of each bolt 5.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A blade mounting arrangement at an interface between a hub and a rotor blade of a wind turbine, which blade mounting arrangement comprises at least
    an annular bearing comprising a stationary part mounted to the hub and a rotating part mounted to a root end of the blade; and
    a reinforcing ring arranged between the bearing rotating part and the root end of the blade, which reinforcing ring includes a cylindrical body portion shaped as an extension of the root end of the blade,
    wherein the reinforcing ring has an H-shaped cross-section comprising a flange at either end of a straight cylindrical web.

2. The blade mounting arrangement according to claim 1, wherein dimensions and material properties of the reinforcing ring are chosen to achieve an increase in stiffness over a comparable blade mounting arrangement in which a blade root end is mounted directly to an annular bearing.

3. The blade mounting arrangement according to claim 1, wherein a main diameter of the reinforcing ring is equal to a main diameter of the root end of the blade.

4. The blade mounting arrangement according to claim 1, wherein a width of at least one of the flanges is equal to a wall thickness of the root end of the blade.

5. The blade mounting arrangement according to claim 1, wherein a width of the straight cylindrical web is at most 50% of a wall thickness of the root end of the blade.

6. The blade mounting arrangement according to claim 1, wherein a height of the reinforcing ring exceeds a height of the annular bearing.

7. The blade mounting arrangement according to claim 1, wherein the reinforcing ring is made of metal.

8. The blade mounting arrangement according to claim 1, comprising at least one reinforcing plate, wherein the at least one reinforcing plate is attached to the annular bearing.

9. A wind turbine comprising a hub and a number of blades mounted to the hub, and further comprising a blade mounting arrangement according to claim 1 at each interface between the hub and each rotor blade.

10. The wind turbine according to claim 9, wherein a main diameter of a root end of each rotor blade measures at least 3.0 m.

11. A method of realizing an interface between a hub and a rotor blade of a wind turbine, which method comprises the steps of     providing an annular bearing at the interface between the hub and the rotor blade and mounting a stationary part of the annular bearing to the hub;

arranging a reinforcing ring between a rotating part of the annular bearing and a root end of the rotor blade, which reinforcing ring comprises a body portion shaped as an extension of the root end of the blade, wherein the reinforcing ring has an H-shaped cross-section comprising a flange at either end of a straight cylindrical web; and     forming a mechanical connection between the rotating part of the annular bearing, the reinforcing ring, and the root end of the blade.

\* \* \* \* \*